UNITED STATES PATENT OFFICE.

FREDERICK G. HUGHES, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

ANTIFRICTION-BEARING.

1,193,019.  Specification of Letters Patent.  Patented Aug. 1, 1916.

Application filed August 31, 1914. Serial No. 859,281.

*To all whom it may concern:*

Be it known that I, FREDERICK G. HUGHES, a citizen of the United States, residing at Bristol, county of Hartford, State of Connecticut, have invented a certain new and useful Antifriction-Bearing, of which the following is a full, clear, and exact description, such as will enable others skilled in the art to which it appertains to make and use the same, reference being had to the accompanying drawings, forming part of this specification.

My invention relates to antifriction bearings, my object being to provide a bearing having barrel-shaped rollers which are so related to the race-members that not only is great durability secured in a bearing affording maximum load-carrying capacity and minimum friction, but also cramping in running is obviated, the structure also being easy to assemble.

To this end, and also to improve generally upon devices of the character indicated, my invention consists in the various matters hereinafter described and claimed.

Figure 1:
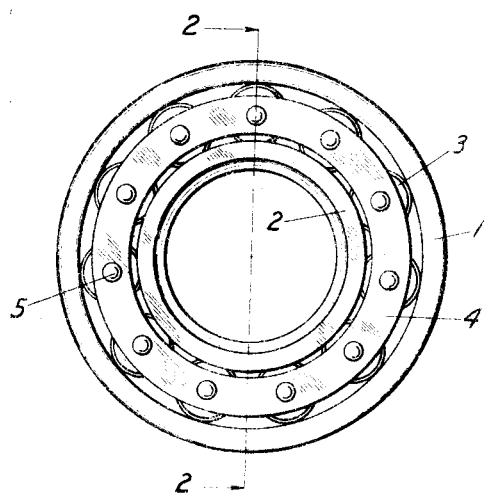
Figure 2:
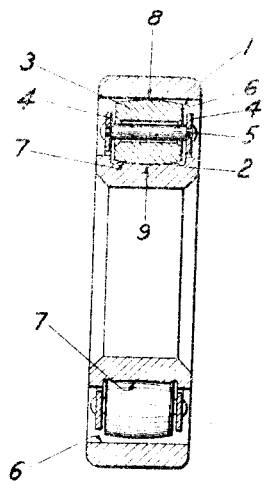
Figure 3:
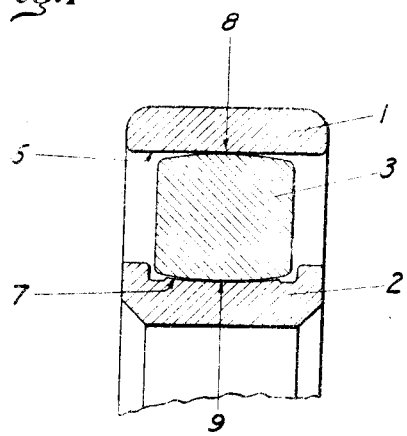

In the accompanying drawings, Figure 1 is a side elevation of a bearing embodying my invention; Fig. 2 is a sectional elevation on about the line 2—2 of Fig. 1, looking in the direction of the arrows; and Fig. 3 is an enlarged, fragmentary section.

In the here illustrated embodiment of my invention, 1 indicates the outer ring or race-member, 2 the inner ring or race-member, and 3 the interposed barrel-shaped, load-supporting antifriction-rollers, the race-members being spaced from each other in a line transverse the axis of rotation of the bearing, as usual, and Figs. 1 and 2 showing the rollers spaced by a cage comprising the side plates 4 and transverse pins 5.

According to my invention, one of the race-members, as 1, has its race surface 6 in a straight line transverse the bearing, while the other race-member, as 2, has its race surface 7 formed as a groove which is tangential to the rollers transversely, the barrel-shaped rollers engaging these respective race surfaces at points, 8 and 9, in a line transverse the axis of rotation of the bearing as a whole. The groove race surface 7 can be conveniently formed upon a radius which is greater than that of the transverse curve of the roller, and the race-member 2 thus extends toward the engaged rollers at each side of the points of tangency therewith. Thus, the strong, barrel-shaped rollers, which are, of course, of greater load-carrying capacity than are balls of like diameter, are held in place in the race-groove 7, and have one-point running contact with such race-groove and with the opposite straight race-surface 6, that material of the race-member 2 at the sides of the points of tangency with the rollers tending to hold the particles of the rollers together and to thus prevent the rollers from splitting; and, there being no obstruction to relative sliding and swinging between the straight-surfaced race-member 1 and the rollers, no canting or cramping results when either race-member, in service, happens to receive thrust in the direction of the long axes of the rollers, any such thrust merely causing relative sliding movement between the rollers and straight-face race-member 1, whereby the rollers continue to run on points which are substantially perpendicular to the axis of rotation of the bearing as a whole, and thus canting or cramping of the rollers, with consequent friction and flattening of them, is obviated. Of course, the concave and straight bearing faces, 7 and 6, present no race parts tending to dig into the rollers and thus cause them to split, such race faces permit the rollers to find their own proper running tracks, as when the bearing is applied to a shaft which may have some deflection, and the straight face 6 permits great ease in assembling as it enables the race-member 1 to be placed upon the rollers by a mere straight-line movement.

Having thus described my invention, what I claim as new and desire to secure by Letters Patent is:

An antifriction bearing comprising opposed race-members and a single series of load-supporting rollers interposed therebetween, each of said rollers being substantially barrel-shaped and engaging the opposite race-members at points in a line transverse the axis of rotation of the bearing, one of said race-members having a race-groove surface tangential to said rollers transversely and extending toward the engaged rollers at each side of the points of tangency therewith, and the other of said race-members having a straight race surface transverse the bearing, said bearing being free from obstruction to relative sliding and swinging between said straight-surfaced race-member and the rollers to avoid cramping and facilitate assembly; substantially as described.

In testimony whereof I hereunto affix my signature in the presence of two witnesses.

FREDERICK G. HUGHES.

Witnesses:
GALES S. MOORE,
WM. E. WIGHTMAN.